M. A. BARTLETT.
GAME.
APPLICATION FILED AUG. 20, 1919.
1,340,001.
Patented May 11, 1920.
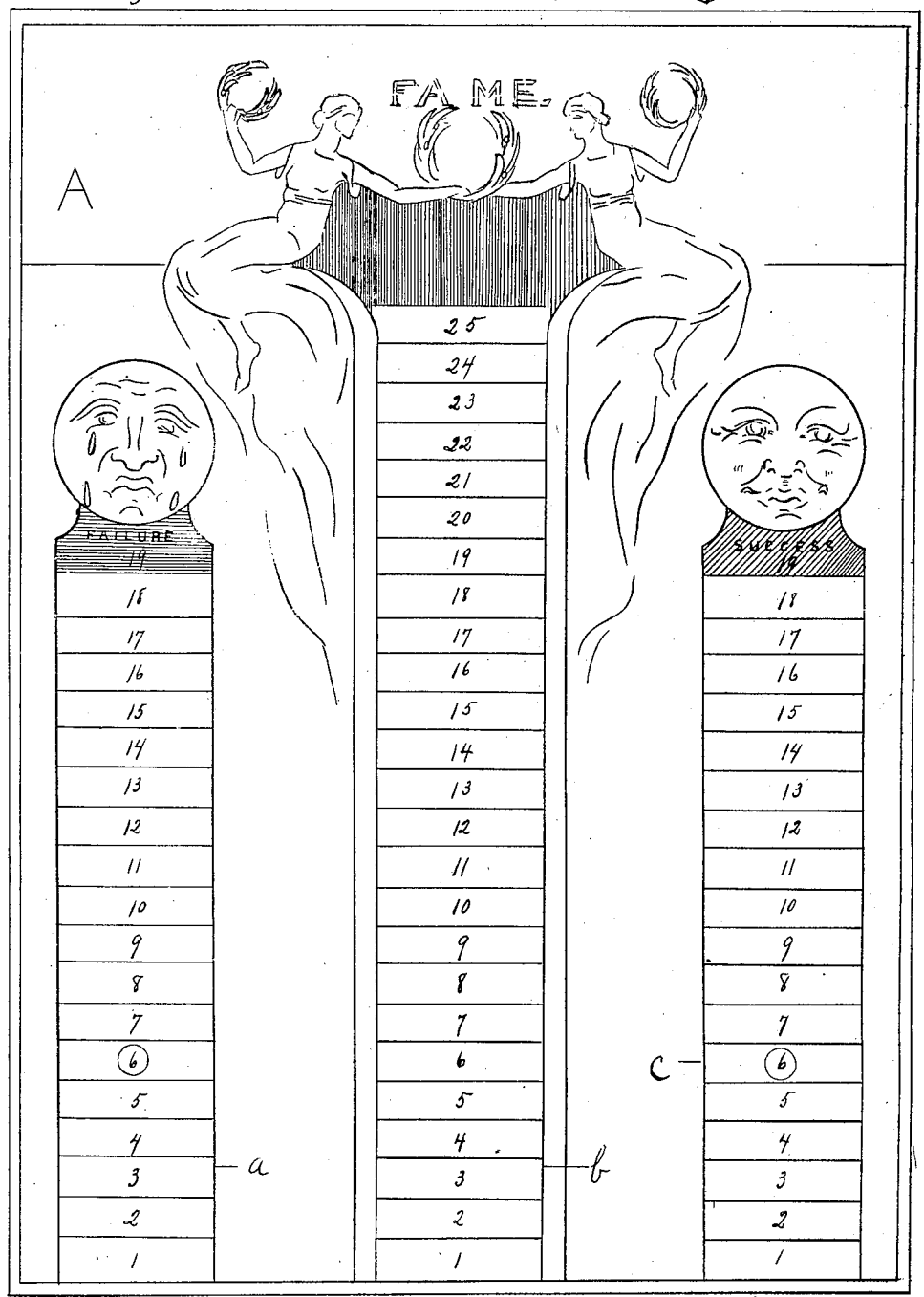

UNITED STATES PATENT OFFICE.

MADELEINE A. BARTLETT, OF BOSTON, MASSACHUSETTS.

GAME.

1,340,001.  Specification of Letters Patent.  Patented May 11, 1920.

Application filed August 20, 1919. Serial No. 318,623.

*To all whom it may concern:*

Be it known that I, MADELEINE A. BARTLETT, a citizen of the United States, and resident of Boston, in the county of Suffolk and State of Massachusetts, have invented certain new and useful Improvements in Games, of which the following is a specification.

This invention relates to games and particularly to that type of game characterized by a plurality of paths or roadways on which counters or "men" are moved in accordance with a certain predetermined system based on the numbers indicated by the fall of dice.

Generally speaking the invention comprises a board or chart on which are arranged three ladder-like roads or paths differently designated having different distinguishing indicia such for example as contrasting colors in combination with a series of correspondingly distinguished counters movable on the particular path indicated by their distinctive marking or coloring such number of spaces as is indicated by the number of dots on the dice whose faces or dots have a distinctive coloring or marking to indicate on which path the movement of the counters is to be made.

In the drawings I have illustrated the preferred form embodying the principles of this invention in which—

Figure 1 is a plan view of the game board showing the ladder-like paths each with its distinctive marking or coloring indication.

Fig. 2 illustrates one of the dice displaying the different numbers of dots on its different faces and also distinctive markings for the purpose to be described.

In the practice of the invention I provide a so-called game board or chart A on which are disposed in this case three different ladder-like paths $a$, $b$ and $c$, the subdivisions or spaces between the rounds of the ladder being progressively numbered from one end to the other and each path having a final compartment at its highest numbered end for the final reception of the counters used in playing the game Any suitable system of distinctive marking may be resorted to such as different pictorial representations at the top of the chart and in this case associated therewith a shading or coloring indicia imposed on each path to distinguish it from the others and corresponding with associated markings or indicia on the dice which fall governs the move of the counters to be used.

Any number of counters may be used but I prefer to employ twelve counters the smaller number of which forms one group distinguished in appearance either by coloring, marking or otherwise from the remainder which constitute the alternative group.

For example, the path marked "Failure" may bear a distinctive color such as blue; column $b$ marked "Fame" may be white, and column $c$ marked "Success" may be yellow. Three of the counters used may be red while the other group of counters may be colored, let us say, green. The red counters are used exclusively on the blue column $a$ while the green counters may be used on either one of the other two columns. After the counters placed on path $c$ have reached the top compartment called Success and numbered 19 further moves of such counters are made on the column $b$ marked Fame but the transfer of counters from the top of column $c$ to the bottom of column $b$ can take place only when the yellow side of the die is upturned and only to the first or lowermost compartment in column $b$ regardless of the number of dots displayed by the fall of the dice.

The object of the game is to attain the highest possible score by getting as many counters as possible out of the nine into the shaded space at the top of the column $b$ marked Fame and before the game ends by the moving of all three of the red counters into the space marked Failure.

To illustrate the scoring, the player scores five points for each counter moved into Success. Also for each counter moved into Success he can move backward one counter on the road to Failure. Whenever a counter is moved into Fame the player may remove any one counter from the road to Failure provided it has not actually entered the final space marked Failure, and if such move into Success does not exceed the number of moves indicated by that fall of the dice he may use the surplus points to move backward another counter on the road to Failure the number of spaces equal to the surplus of points so indicated by the throw of dice.

Certain numbers on the different paths may be surrounded with a circle or accompanied by any distinctive mark to indicate a special move in case any counter moved shall come to rest on that particular space. For example, the sixth compartment on paths a and c are encircled to indicate such special move which may signify on column c the option of advancing such counter six additional spaces or placing an additional counter along side the one placed on the sixth compartment.

The rules for playing the game may be greatly varied but the distinctive feature is the two paths movement along which tends to increase the score in the manner indicated. At the end of the game for each counter remaining that has reached the compartment Fame ten points are allowed in addition to the five points that are scored for each counter that passes into Success. Obviously, the sooner the three counters reach Failure the lower will be the number of points scored, consequently, the object is to advance along paths b and c to the maximum extent possible while retarding the entrance of the counters into the compartment Failure.

The term "board" will be understood is used to designate any tablet or card or chart adapted to carry the representations and markings which are characteristic of the game regardless of the material of which the so-called chart is made.

What I claim is:

1. A game comprising a board containing a plurality of paths having distinguishing indicia and subdivided from end to end into a series of progressively numbered divisions, a series of counters bearing distinguishing indicia for movement on the different paths, and dice whose faces have different numbered indicia said faces also having distinguishing marking in correspondence with the different paths on the board to indicate the location of the different counters, substantially as described.

2. A game comprising a game board on which are arranged three separate ladder-like paths whose individual spaces are consecutively numbered from end to end each path being distinguished from the others by suitable markings combined with two groups of counters of unequal number each group being distinguished from the other in any suitable manner to indicate on which path they may be moved, and dice whose faces are differently marked to indicate both the number of steps of movement and the particular path on which the counters are to be moved, substantially as described.

3. A game board on which are arranged three separate columns sub-divided from end to end into compartments numbered consecutively from bottom to top said compartments being differently designated for purposes of distinguishing them in playing the game, a series of counters divided into two groups of counters, the smaller group being distinguished from the larger group by suitable marking to indicate the path on which said smaller group is moved, and a series of dies having different number of coloring markings on their different faces to indicate the number of steps of movement of the counters and the particular paths on which said movements are to be made, substantially as described.

In witness whereof, I have subscribed the above specification.

MADELEINE A. BARTLETT.